United States Patent
Shimizu et al.

[11] Patent Number: 6,067,201
[45] Date of Patent: May 23, 2000

[54] DISK PROTECTION METHOD FOR REMOVABLE MAGNETIC RECORDING/REPRODUCING DEVICE

[75] Inventors: Toshiharu Shimizu, Machida; Yoshihide Majima, Hadano; Toshimitsu Itoh; Hidetsugu Touji, both of Atsugi, all of Japan

[73] Assignee: Mitsumi Electric Co., Ltd., Tokyo, Japan

[21] Appl. No.: 08/994,852

[22] Filed: Dec. 19, 1997

[30] Foreign Application Priority Data

Dec. 25, 1996 [JP] Japan .................................. 8-345860

[51] Int. Cl.⁷ .................................................. G11B 19/02
[52] U.S. Cl. .............................. 360/69; 360/60; 360/71; 360/73.03; 360/75
[58] Field of Search ................................ 360/69, 60, 71, 360/75, 73.03, 99.01, 99.02, 99.03, 99.06, 99.07

[56] References Cited

U.S. PATENT DOCUMENTS 5,119,252  6/1992  Kamata et al. ........................ 360/71 X
5,227,927  7/1993  Fukushima et al. ...................... 360/69

FOREIGN PATENT DOCUMENTS 56-137511  10/1981  Japan .
6-309771  11/1994  Japan .
7-210980  8/1995  Japan .

OTHER PUBLICATIONS

Takahashi et al., JP61–82375, "Drive System of Magnetic Disk," JPO English Abstract, Apr. 25, 1986.

*Primary Examiner*—Andrew L. Sniezek
*Assistant Examiner*—James L Habermehl
*Attorney, Agent, or Firm*—Frishauf, Holtz, Goodman, Langer & Chick, P.C.

[57] ABSTRACT

In a disk protection method for protecting a magnetic recording disk upon ejection thereof from a removable magnetic recording/reproducing device by an eject mechanism through operation of an eject button, data writing relative to the magnetic recording disk is inhibited in response to a data write inhibit signal which is generated immediately after the operation of the eject button and before the eject mechanism actually starts the ejection of the magnetic recording disk. The eject mechanism actually ejects the magnetic recording disk from the removable magnetic recording/reproducing device in a condition where the data writing is inhibited.

3 Claims, 8 Drawing Sheets

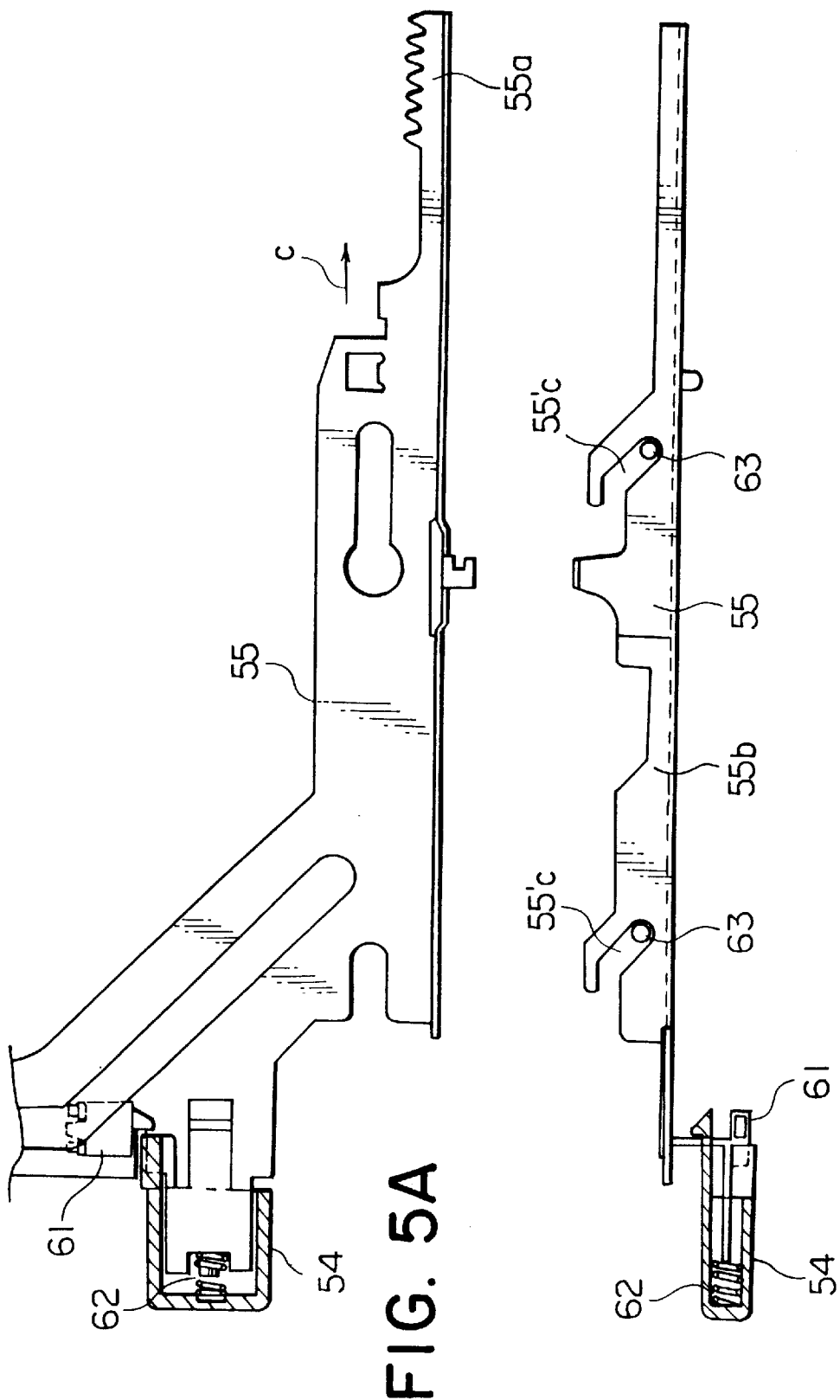

DISK PROTECTION METHOD FOR REMOVABLE MAGNETIC RECORDING/ REPRODUCING DEVICE

BACKGROUND OF THE INVENTION

The present invention relates to a removable magnetic recording/reproducing device capable of loading and unloading a magnetic recording disk, such as a flexible disk drive carrying out data recording and reproducing relative to a flexible disk and, in particular, to a data protective structure which is effective when an eject button is pushed during data writing relative to a magnetic recording medium of a magnetic recording disk.

The following explanation deals with a flexible disk drive as a removable magnetic recording/reproducing device, but is also applicable to other removable magnetic recording/ reproducing devices.

As is well known in the art, a flexible disk drive is a device for performing data recording and reproducing relative to a flexible disk inserted therein. In recent years, the flexible disk has been improved to have a greater capacity. For example, a large-capacity flexible disk having a storage capacity of 128 Mbytes has been developed while a normal-capacity flexible disk has a storage capacity of 1 Mbyte to 2 Mbytes. Following this, a flexible disk drive has also been developed which is capable of data recording and reproducing relative to such a large-capacity flexible disk.

Hereinafter, a flexible disk drive capable of data recording and reproducing relative to a magnetic disk medium (magnetic recording medium) of only the large-capacity flexible disk will be referred to as a high-density dedicated flexible disk drive, while a flexible disk drive capable of data recording and reproducing relative to a magnetic disk medium of only the normal-capacity flexible disk will be referred to as a normal-density dedicated flexible disk drive. On the other hand, a flexible disk drive capable of data recording and reproducing relative to magnetic disk mediums of both the large-capacity and normal-capacity flexible disks will be referred to as a high-density/normal-density flexible disk drive. Further, the high-density dedicated flexible disk drive and the high-density/normal-density flexible disk drive will be collectively referred to as a high-density flexible disk drive.

One of differences in mechanism between the normal-density dedicated flexible disk drive and the high-density flexible disk drive resides in structure of drive units each for moving a carriage holding a magnetic head in a predetermined radial direction with respect to the magnetic disk medium of the flexible disk loaded in the disk drive. Specifically, the normal-density dedicated flexible disk drive employs a stepping motor as the drive unit, while the high-density flexible disk drive employs a linear motor, such as a voice coil motor (VCM), as the drive unit.

Hereinbelow, the voice coil motor employed in the high-density flexible disk drive as the drive unit will be briefly explained. The voice coil motor includes a voice coil disposed rearward of the carriage and wound around a drive shaft extending in parallel to the foregoing predetermined radial direction, and a magnetic circuit for producing a magnetic field intersecting the electric current flowing through the voice coil. With this arrangement, when the electric current is caused to flow through the voice coil in a direction intersecting the magnetic field produced by the magnetic circuit, a drive force is generated in an extending direction of the drive shaft based on interaction between the electric current and the magnetic field. This drive force causes the carriage to move in the foregoing predetermined radial direction.

There is no substantial difference in appearance between the large-capacity flexible disk and the normal-capacity flexible disk. However, since a track width (track pitch) of the large-capacity flexible disk is narrower than that of the normal-capacity flexible disk, servo signals for positional detection are written on the magnetic disk medium of the large-capacity flexible disk.

It is assumed that an eject button is pushed during data writing relative to a magnetic disk medium of a flexible disk in either of the normal-density dedicated flexible disk drive and the high-density flexible disk drive. In this case, not only the data writing is disabled, but also data written on the magnetic disk medium is destroyed. Particularly, since, as described above, the servo signals are written on the magnetic disk medium of the large-capacity flexible disk, those servo signals are also destroyed so that a position control of a magnetic head is made impossible.

Under the circumstances, such a data protective structure has been demanded, wherein, even if the eject button is depressed in error during data writing relative to the magnetic disk medium, data written on the magnetic disk medium is protected. Further, in addition to the protection of data written on the magnetic disk medium, it has been also demanded that the magnetic disk medium is prevented from a substantial damage upon ejection of the flexible disk from the disk drive caused by such erroneous depression of the eject button.

SUMMARY OF THE INVENTION

It is therefore an object of the present invention to provide a disk protection method for a removable magnetic recording/reproducing device, wherein, even if an eject button is pushed in error during data writing relative to a magnetic recording medium of a magnetic recording disk, data written on the magnetic recording medium is protected, and further, the magnetic recording medium is prevented from a substantial damage.

Other objects of this invention will become clear as the description proceeds.

A disk protection method to which this invention is applicable is for protecting a magnetic recording disk upon ejection thereof from a removable magnetic recording/ reproducing device by an eject mechanism through operation of an eject button. The method comprises the steps of generating a data write inhibit signal immediately after a start of the operation of the eject button and before the eject mechanism actually starts the ejection of the magnetic recording disk, inhibiting data writing relative to the magnetic recording disk in response to the data write inhibit signal, and making the eject mechanism actually eject the magnetic recording disk from the removable magnetic recording/reproducing device in a condition where the data writing is inhibited.

Another disk protection method to which this invention is applicable is for use in a removable magnetic recording/ reproducing device comprising a spindle motor for rotating a magnetic recording disk loaded in the device, a magnetic head for carrying out data writing/reading relative to a magnetic recording medium of the magnetic recording disk, a carriage holding the magnetic head, a drive mechanism for driving the carriage in a predetermined radial direction, an eject mechanism for ejecting the magnetic recording disk through an operation of an eject button, and an eject switch which produces a data write inhibit signal immediately after the operation of the eject button and before the start of an actual eject operation by the eject mechanism. The disk protection method is for protecting the magnetic recording disk upon ejection thereof by the eject mechanism through the operation of the eject button. The method comprises the steps of inhibiting data writing by the magnetic head relative to the magnetic recording medium in response to the data write inhibit signal, deenergizing the spindle motor, moving the magnetic head by the drive mechanism so as to escape to a landing zone of the magnetic recording medium, braking the spindle motor after a lapse of a first delay time necessary for the magnetic head to securely escape to the landing zone, and starting the actual eject operation by the eject mechanism after a lapse of a second delay time necessary for rotation of the spindle motor to be fully stopped by braking the spindle motor.

BRIEF DESCRIPTION OF THE DRAWING

FIGS. 5A and 5B are diagrams showing a part of an eject mechanism included in the flexible disk of FIGS. 1 and 2, wherein FIG. 5A is a plan view, FIG. 5B being a right-side view;

FIGS. 6A and 6B are diagrams showing a modification of the eject mechanism of FIGS. 5A and 5B, wherein FIG. 6A is a plan view and FIG. 6B is a right-side view.

DESCRIPTION OF THE PREFERRED EMBODIMENT

Figure 1:
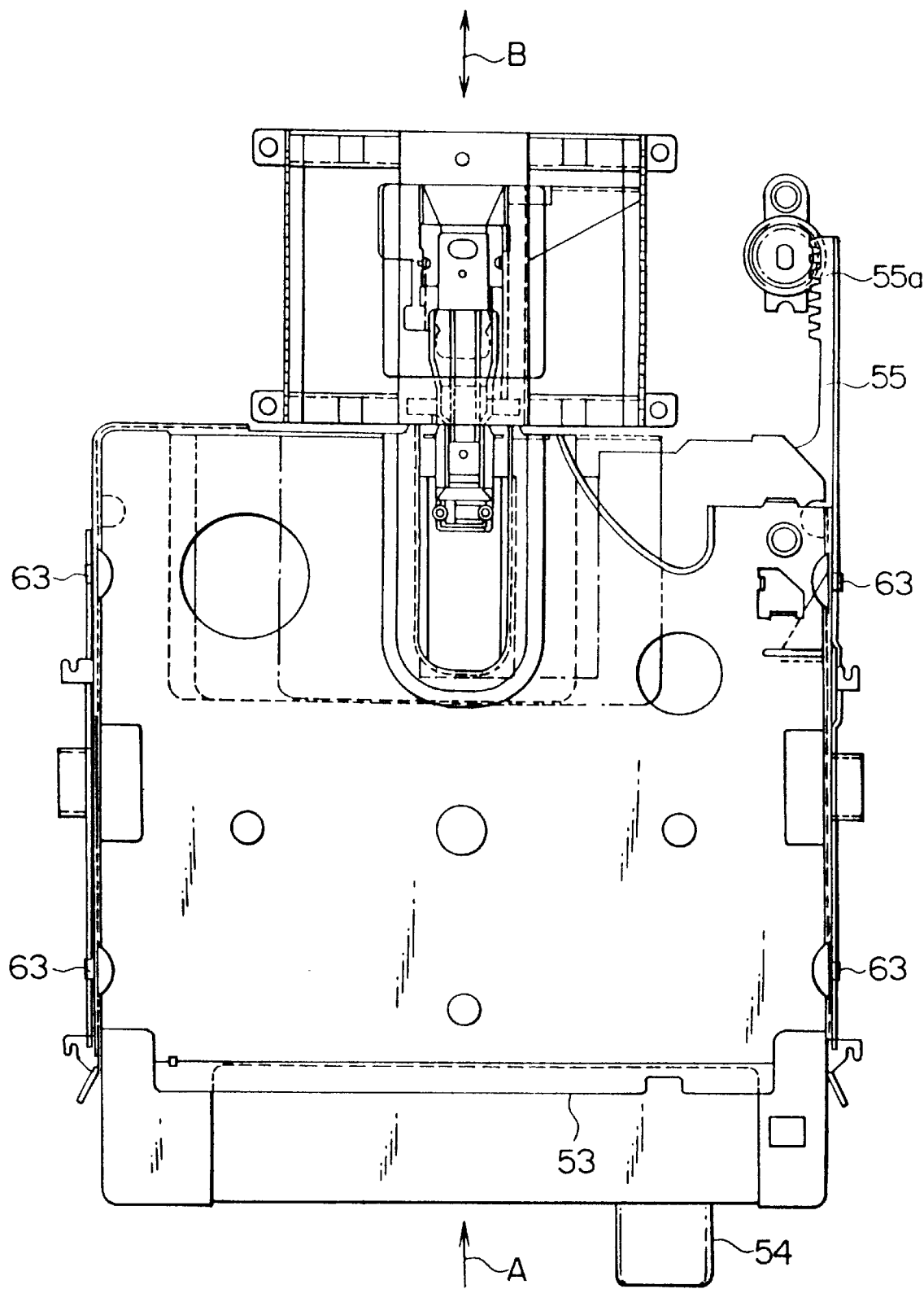
FIG. 1 is a plan view showing a main part of a flexible disk drive, as an example of a removable magnetic recording/reproducing device, to which a disk protection method according to a preferred embodiment of this present invention is applied.
Figure 2:
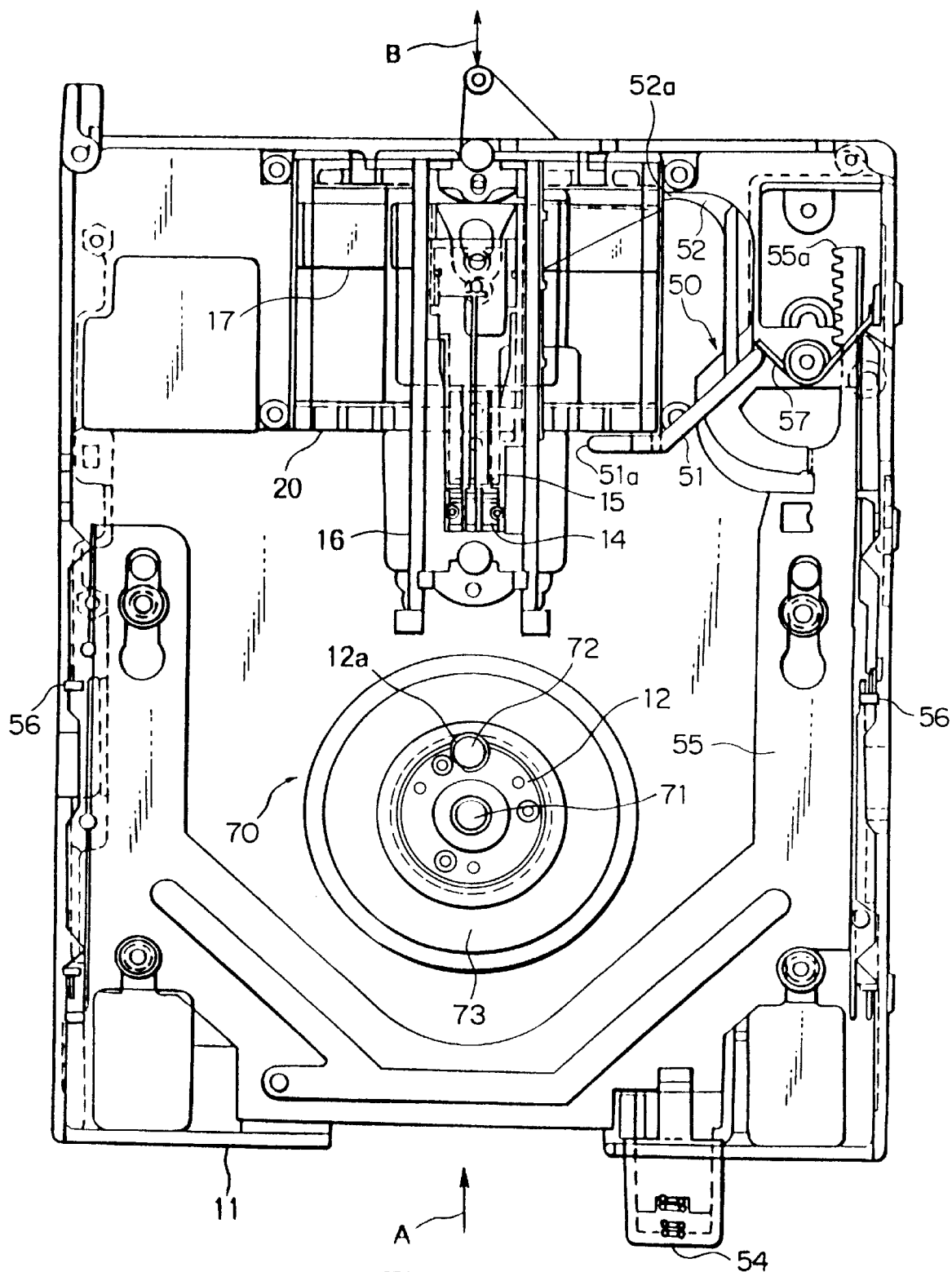
FIG. 2 is a plan view of the flexible disk drive of FIG. 1, in which a disk holder unit is omitted from the flexible disk drive.

Referring to FIGS. 1 and 2 at first, description will be made about a flexible disk drive, as an example of a removable magnetic recording/reproducing device, to which a disk protection method according to the preferred embodiment of the present invention is applied. The shown flexible disk drive is a device for carrying out data recording and reproducing relative to a flexible disk which is designated by a reference numeral 40 in FIG. 3 and will later be described. The flexible disk is inserted into the flexible disk drive along a direction identified by an arrow A in FIGS. 1 and 2. FIG. 2 shows the state where the flexible disk is loaded in the flexible disk drive.

The inserted flexible disk is held on a disk table 12 with their center axes coinciding with each other. The disk table 12 is rotatably supported on the surface of a main frame 11 of the flexible disk drive. The disk table 12 is rotated by a spindle motor 70 provided on the main frame 11 so as to rotate a magnetic disk medium in the flexible disk. Further, a printed circuit board (not shown) mounted with a number of electronic components is attached to the underside of the main frame 11.

The flexible disk drive includes a magnetic head (not shown) for carrying out data reading and writing relative to the magnetic disk medium in the flexible disk. The magnetic head is held by a carriage 15 via a gimbal 14. A unit of the magnetic head, the gimbal 14, the carriage 15, an FPC (flexible printed circuit), a spring holder and a spring is called a carriage assembly. The carriage 15 is arranged over and spacing from the surface of the main frame 11 and holds the magnetic head so as to be movable in a predetermined radial direction, as shown by arrows B in FIG. 2, with respect to the flexible disk.

On both sides, the carriage 15 is supported and guided at its lower ends by a pair of guide bars 16 extending in parallel to the predetermined radial direction B.

The carriage 15 is driven in the predetermined radial direction B by a voice coil motor (VCM). The voice coil motor includes a pair of voice coils 17 disposed rearward of the carriage 15 and each wound around a drive shaft extending in parallel to the foregoing predetermined radial direction B, and magnetic circuits 20 each for producing a magnetic field intersecting the electric current flowing through the corresponding voice coil 17. With this arrangement, when the electric current is caused to flow through each of the voice coils 17 in a direction intersecting the magnetic field produced by the magnetic circuit 20, a drive force is generated in an extending direction of the drive shaft based on interaction between the electric current and the magnetic field. The generated drive forces cause the carriage 15 to move in the foregoing predetermined radial direction B.

The spindle motor 70 is mounted as being buried in a recess (not shown) provided on the surface of the main frame 11. The spindle motor 70 has a spindle shaft 71 standing substantially at the right angle relative to the principal plane of the main frame 11. The spindle shaft 71 is rotatably supported relative to the main frame 11 via a ball bearing (not shown). The spindle shaft 71 works as a rotation shaft of the flexible disk loaded in the flexible disk drive. The disk table 12 is fitted around the spindle shaft 71.

Figure 3:
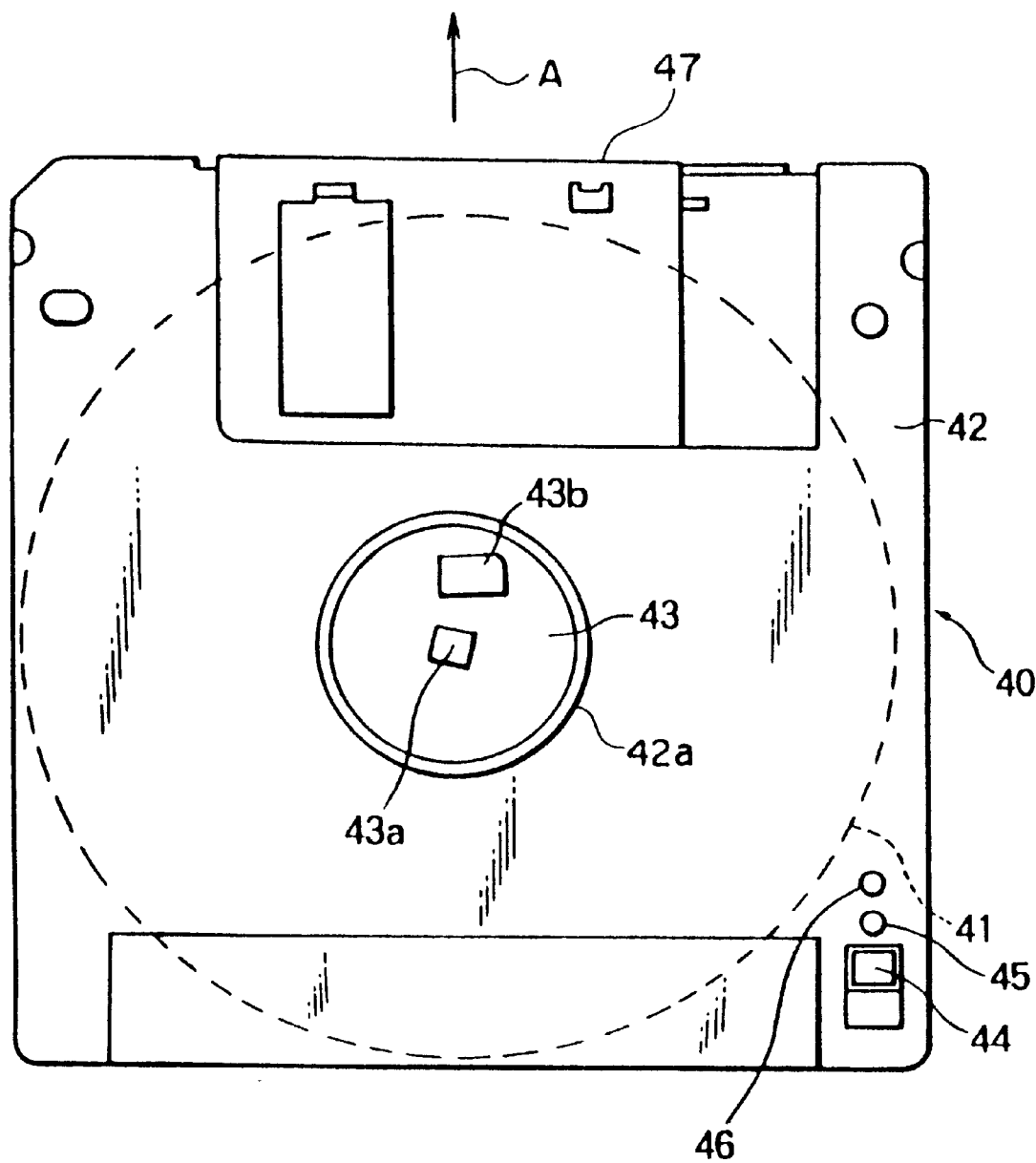
FIG. 3 is a plan view of a flexible disk, as seen from the underside thereof, to be loaded into the flexible disk drive shown in FIGS. 1 and 2.
Figure 4:
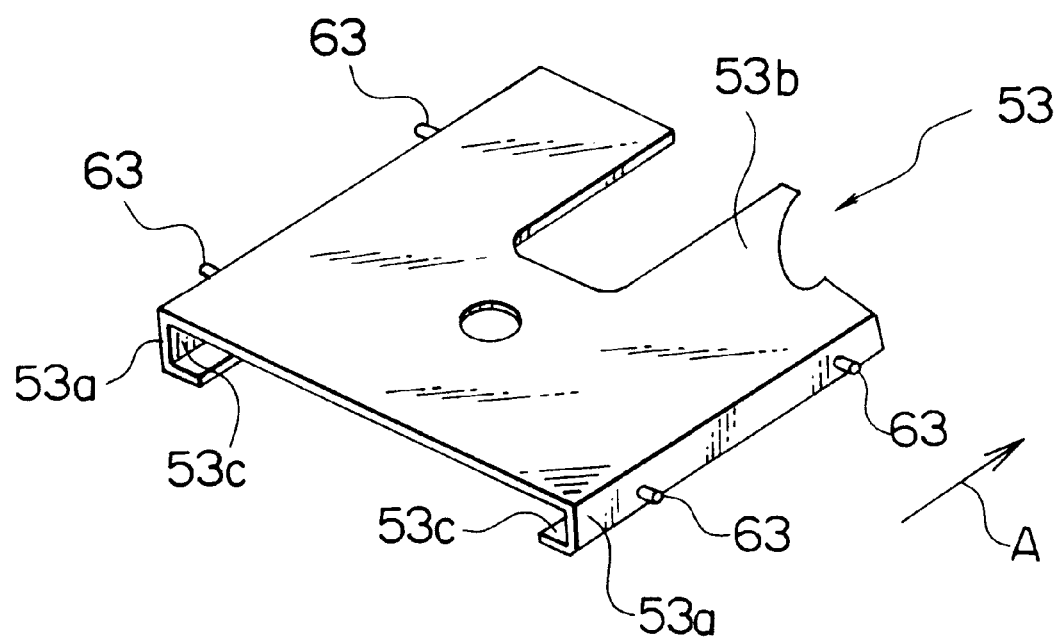
FIG. 4 is a schematic perspective view of the disk holder unit included in the flexible disk drive of FIGS. 1 and 2.

Referring to FIG. 4 shortly, the flexible disk 40 will be described. The flexible disk 40 comprises a magnetic disk medium 41 as a magnetic recording medium, and a casing 42 covering the magnetic disk medium 41. On the underside of the casing 42, a circular opening 42a is formed at the center thereof. In the circular opening 42a, a disk hub 43 holding the magnetic disk medium 41 is loosely disposed. The disk hub 43 is provided at the center thereof with a disk center hole 43a into which the spindle shaft 71 is loosely fitted, and at a peripheral position offset from the disk center hole 43a with a chucking hole 43b into which a later-described chucking pin 72 (see FIG. 3) is loosely fitted.

Referring back to FIGS. 1 and 2, the description is proceeded as regards the flexible disk drive. The disk table 12 has a diameter which is set greater than that of the disk hub 43 and smaller than that of the circular opening 42a. The disk table 12 is formed with a table-side elongate driving hole 12a at a position corresponding to the chucking hole 43b. The spindle motor 70 includes the chucking pin 72 which is loosely fitted into the chucking hole 43b via the table-side elongate driving hole 12a. The chucking pin 72 is rotatably and vertically movably mounted to a magnet case 73 attached to the underside of the disk table 12.

The flexible disk 40 shown in FIG. 3 is a large-capacity flexible disk and is provided near a write protection tab 44 with a hole 45 for large-capacity detection and a hole 46 for kind detection. The flexible disk 40 is further provided with a shutter 47. The flexible disk drive includes a shutter drive mechanism for opening and closing the shutter 47 of the flexible disk, an eject mechanism for ejecting the loaded flexible disk from the flexible disk drive, and a carriage lock mechanism for locking the carriage 15 after ejecting the flexible disk.

A lever unit 50 includes an eject lever 51 and a lock lever 52. The eject lever 51 doubles as an element of the foregoing shutter drive mechanism and an element of the foregoing eject mechanism. The lock lever 52 is arranged near the carriage 15 for locking the carriage 15 upon ejecting the flexible disk.

The eject mechanism includes an eject button 54 protruding from a front bezel (not shown) of the flexible disk drive, an eject plate 55 for positioning the flexible disk inserted via an insertion slot (not shown) of the front bezel such that one side of the flexible disk faces the eject plate 55, and a pair of eject springs 56 each having one end engaging with the eject plate 55 and the other end engaging with a disk holder unit (not shown). The eject plate 55 is provided with a rack 55a at its tip in an insertion direction of the flexible disk. The rack 55a meshes with a pinion (not shown) rotatably supported on the surface of the main frame 11. The lever unit 50 is biased by a spring mechanism 57 in a counterclockwise direction.

When the flexible disk is inserted into the flexible disk drive along the direction A in each of FIGS. 1 and 2, a tip 51a of the eject lever 51 engages with a right-upper end of the shutter 47 and the lever unit 50 rotates in a clockwise direction following the movement of the flexible disk. Following this, the shutter 47 is caused to slide by the tip 51a of the eject lever 51 so as to be open. When the flexible disk is fully received in the flexible disk drive, the flexible disk is held in the disk holder unit 53 by a disk lock mechanism (not shown).

Referring to FIG. 4, the disk holder unit 53 will be described. The disk holder unit 53 has two side portions 53a opposite to each other and an upper plate portion 53b extending between the side portions 53a. The side portions 53a have guide grooves 53c inwardly facing to each other. The guide grooves 53c are for guiding insertion of the flexible disk into the the flexible disk drive in cooperation with each other. Namely, opposite side portions of the flexible disk are received in the guide grooves 53c, respectively, when the flexible disk is inserted in the flexible disk drive. Each of the side portions 53a is provided with two pins 63 which are spaced in the direction A and outwardly protruded therefrom.

Referring to FIGS. 5A and 5B, the description will be proceeded as regards the eject mechanism. The eject mechanism further comprises an eject switch 61 which produces a data write inhibit signal immediately after the depression of the eject button 54 and before the start of an actual operation of the eject mechanism. In response to the depression of the eject button 54, the eject plate 55 moves forward as indicated by an arrow C. As seen from FIGS. 5A and 5B, the eject switch 61 is arranged adjacent to the eject button 54 in a direction in which the eject button 54 is pushed. The shown data protective structure includes a compression spring 62 between the eject button 54 and the eject plate 55. As shown in FIGS. 5A and 5B, while the flexible disk is loaded in the flexible disk drive, the compression spring 62 retains the state where the eject button 54 and the eject plate 55 are spaced from each other. Upon depression of the eject button 54, the eject switch 61 is turned on to produce a data write inhibit signal before the eject button 54 abuts the eject plate 55.

The data write inhibit signal is sent to a controller which will later be described with reference to FIGS. 7 and 8. In response to the data write inhibit signal from the eject switch 61, the controller inhibits data writing relative to the flexible disk. Since the data writing relative to the flexible disk can be inhibited before the eject operation is actually carried out, the data written on the flexible disk can be protected.

The eject plate 55 is disposed inside the main frame 11 (see FIG. 2) and is movable in the direction C relative to the main frame 11. The eject plate 55 is provided with side plates 55b at both sides thereof. Each of the side plates 55b has two guide grooves 55c' which are received with the pins 63 of the disk holder unit 53 (see FIG. 4). With this structure, the disk holder unit 53 is supported by the side plates 55b of the eject plate 55 through the pins 63.

After the eject switch 61 is turned on, the eject plate 55 is moved in the direction C in response to continuous pushing of the eject button 54. Each of the guide grooves 55c' extends slant to the direction C. Therefore, the disk holder unit 53 is moved upwardly and downwardly in accordance with movement of the eject plate 55 in the direction C.

Figures 6A, 6B:
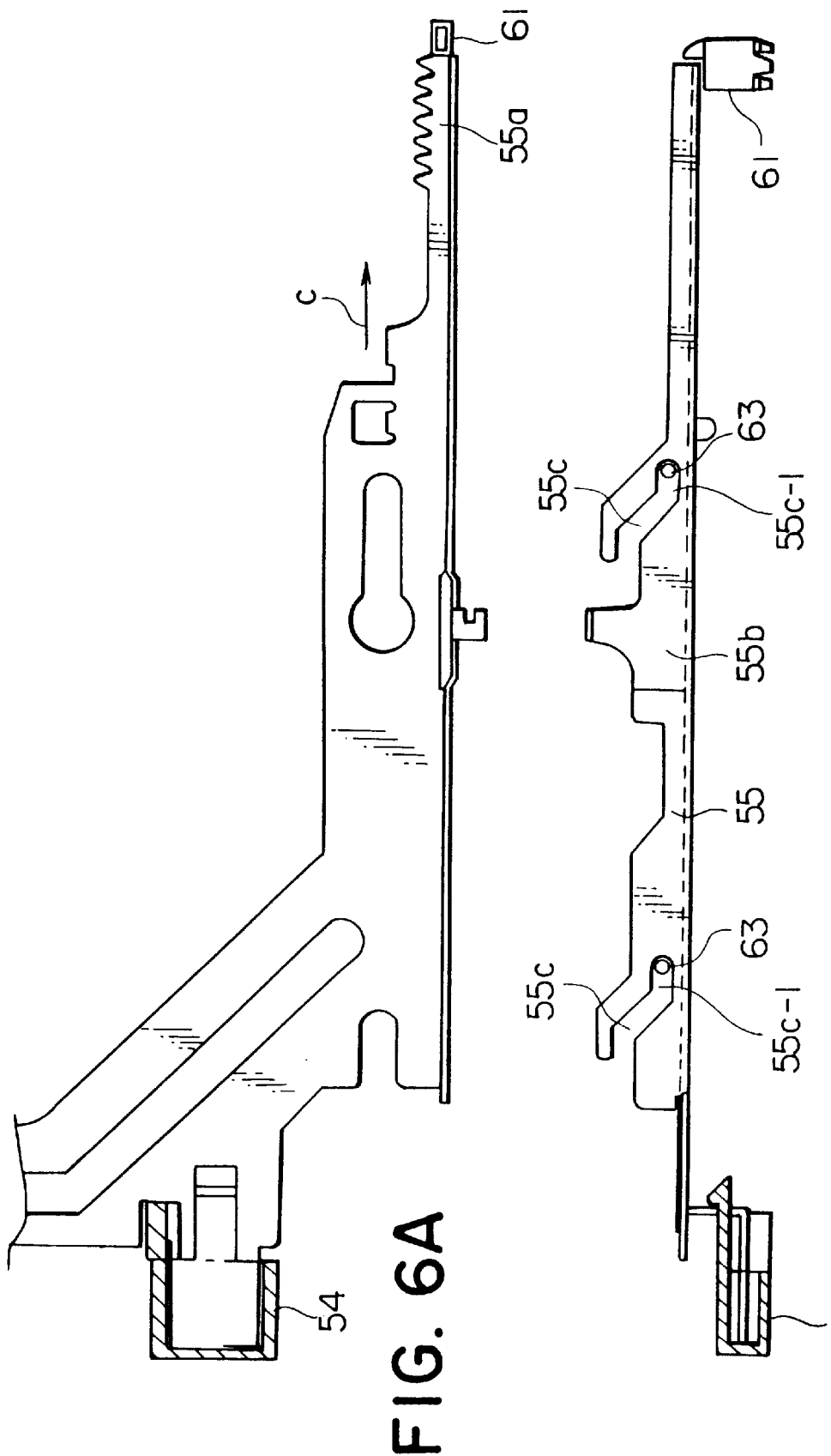

Referring to FIGS. 6A and 6B, the description will be made about a modification of the eject mechanism. FIGS. 6A and 6B show the state before depression of the eject button 54.

In the eject mechanism shown in FIGS. 6A and 6B, an eject switch 61 is arranged adjacent to the eject plate 55 in a direction C in which the eject plate 55 is pushed by the eject button 54. The eject plate 55 is disposed inside the main frame 11 (see FIG. 2) and provided with side plates 55b at both sides thereof. Each of the side plates 55b has two guide grooves 55c for guiding the disk holder unit. The disk holder unit is disposed inside the eject plate 55. The disk holder unit has side plates at both sides thereof, each having two pins 63 corresponding to the two guide grooves 55c of the corresponding side plate of the eject plate 55.

In the eject mechanism shown in FIGS. 6A and 6B, the shape of each guide groove 55c differs from that of a guide groove 55'c shown in FIG. 5B. Specifically, each guide groove 55c has a play portion 55c-1 extending in a moving direction of the eject plate 55 as indicated by the arrow C. With this arrangement, upon depression of the eject button 54, the eject switch 61 is turned on to produce a data write inhibit signal before the disk holder unit is raised.

The data write inhibit signal is sent to the controller. In response to the data write inhibit signal from the eject switch 61, the controller 30 inhibits data writing relative to the flexible disk.

According to the foregoing data protective structure, since the data writing relative to the flexible disk can be inhibited before the eject operation is actually carried out, the data written on the flexible disk can be protected.

According to the foregoing data protective structure shown in FIGS. 5A and 5B or 6A and 6B, the data written on the magnetic disk medium of the flexible disk can be protected even if the eject button is depressed in error during data writing relative to the magnetic disk medium. However, it is still possible that the magnetic disk medium is damaged upon ejection of the flexible disk from the disk drive caused by such erroneous depression of the eject button.

Accordingly, in addition to the data protection, this preferred embodiment further aims to protect the magnetic disk medium from a substantial damage upon such erroneous ejection of the flexible disk.

Figure 7:
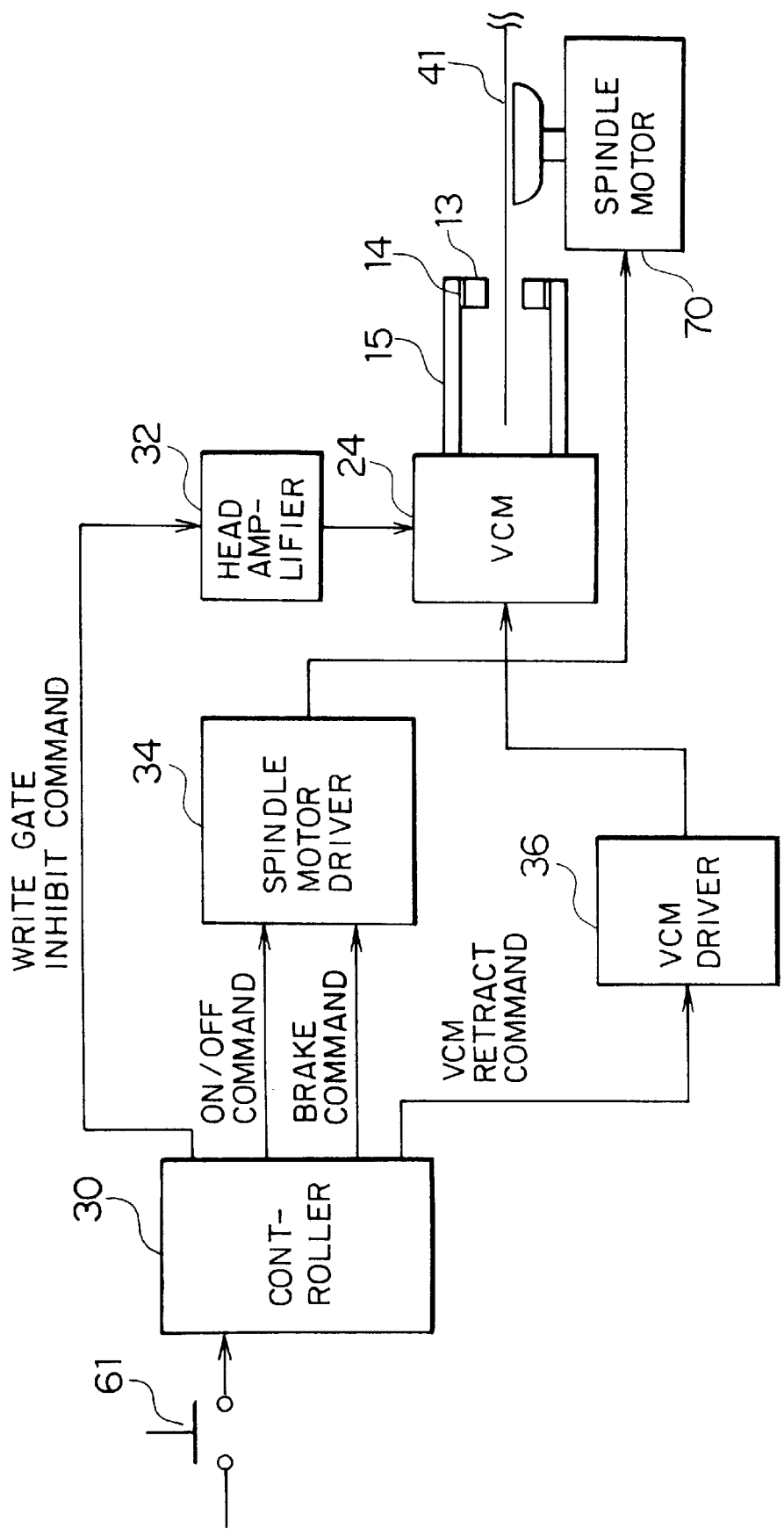
FIG. 7 is a block diagram of a control device included in the flexible disk drive of FIGS. 1 and 2.

Referring to FIG. 7, the description will be made as regards a control device, that is, a hardware structure, for carrying out the disk protection method according to this preferred embodiment. The shown control device comprises the foregoing controller 30, a head amplifier 32 for amplifying data to/from the magnetic head 13, a spindle motor driver 34 for driving the spindle motor 70, and a VCM driver 36 for driving the VCM 24 including the voice coils 17 and the magnetic circuits 20.

Figure 8:
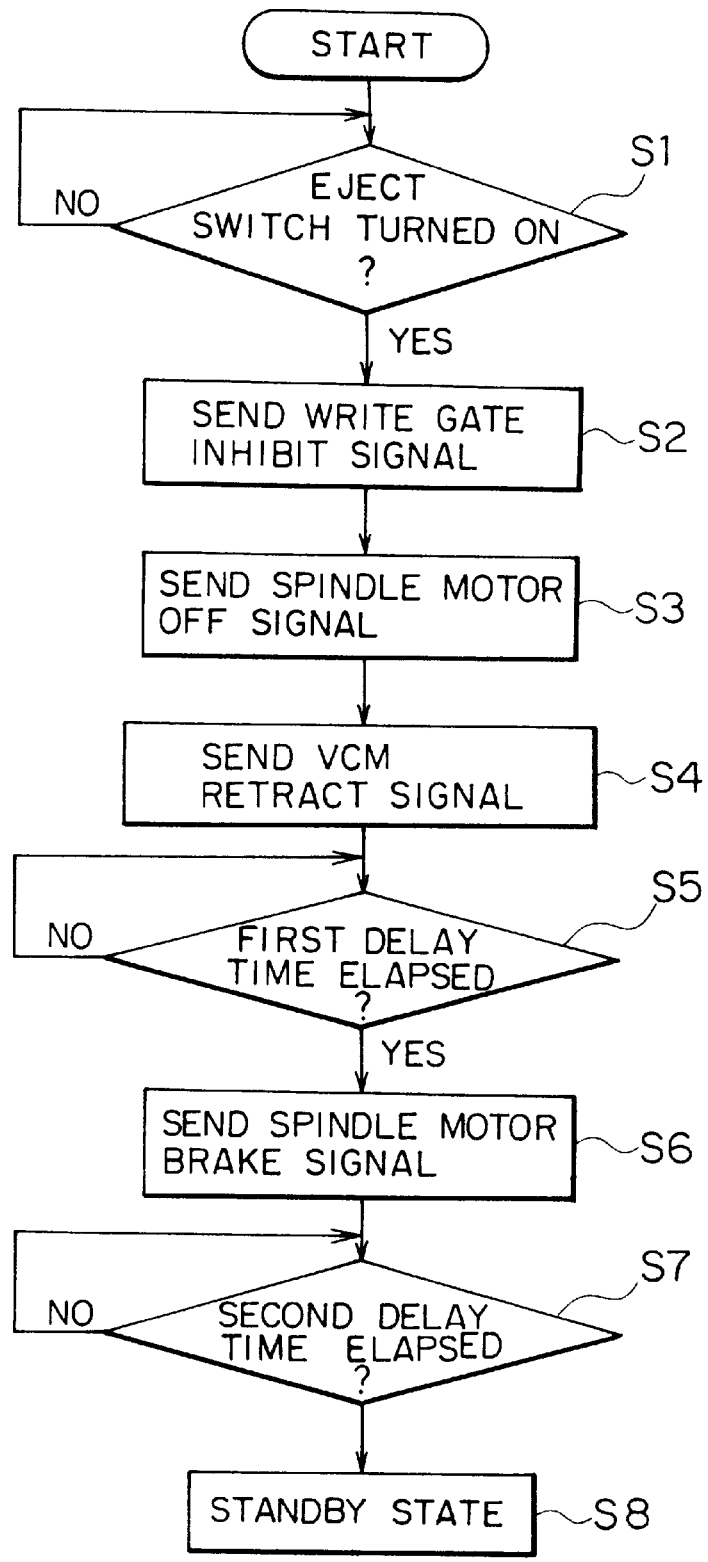
FIG. 8 is a flowchart for describing an operation of the control device illustrated in FIG. 7.

Now, referring to FIG. 8 together with FIG. 7, the description will be directed to the disk protection method according to an embodiment of this invention. The controller 30 monitors whether the eject switch 61 is turned on, that is, whether the data write inhibit signal is received from the eject switch 61 (step S1). If answer at step S1 is positive, that is, if the eject switch 61 is turned on, the controller 30 produces a write gate inhibit command signal (step S2). In response to the write gate inhibit command signal, the head amplifier 32 sets an energization enable terminal for the magnetic head 13 to the use inhibit state. Accordingly, the data writing of the magnetic head 13 relative to the magnetic disk medium 41 of the flexible disk 40 is inhibited.

Subsequently, the controller 30 sends a spindle motor off signal for deenergizing the spindle motor 70 to the spindle motor driver 34 and a VCM retract signal to the VCM driver 36 (steps S3 and S4). In response to the spindle motor off signal, the spindle motor driver 34 deenergizes the spindle motor 70. In response to the VCM retract signal, the VCM driver 36 controls the VCM 24 to carry out a retract operation so that the magnetic head 13 escapes to a landing zone of the magnetic disk medium 41 of the flexible disk 40. As is well known in this technical field, the landing zone is an innermost region (non-usable region) of the magnetic disk medium 41 where data writing/reading is never carried out even during operation of the flexible disk drive. During the retract operation, the VCM driver 36 supplies the constant current to the voice coils 17. By means of the retract operation, the magnetic disk medium 41 is prevented from a damage. It is to be noted that, even if the spindle motor 70 is deenergized, the spindle motor 70 (the disk table 12) continues to rotate due to inertia. For example, if no brake is applied, the rotation of the spindle motor 70 is stopped after a lapse of about three seconds from the time point when the spindle motor 70 is deenergized.

The magnetic head 13 requires a time for escaping to the landing zone of the magnetic disk medium 41. Accordingly, after a lapse of a first delay time (YES at step S5), the controller 30 sends a brake command signal to the spindle motor driver 34 (step S6). The first delay time is set to a value necessary for the magnetic head 13 to securely escape to the foregoing landing zone, which is, for example, 100 msec. In response to the brake command signal, the spindle motor driver 34 carries out braking of the spindle motor 70. For braking the spindle motor 70, the circuit may be shorted or other methods may be carried out.

The reason for braking the spindle motor 70 is as follows: As described above, even if the spindle motor 70 is deenergized, the spindle motor 70 continues to rotate due to inertia without applying the brake. On the other hand, due to subsequent depression of the eject button 54, the eject button 54 abuts the eject plate 55 so that the eject operation is started. Then, the disk holder unit is raised so that the chucking of the flexible disk 40 starts to be released. That is, the engagement between the chucking pin 72 of the spindle motor 70 and the chucking hole 43b of the flexible disk 40 starts to be released. This causes the rotation of the magnetic disk medium 41 of the flexible disk 40 to be stopped. However, as described above, since the spindle motor 70 continues to rotate due to inertia, the chucking pin 72 of the spindle motor 70 goes in and out relative to the chucking hole 43b of the flexible disk 40 to make a clattery sound. As a result, it is possible that the chucking pin 72 is damaged. Thus, in this embodiment, for avoiding the damage of the chucking pin 72, the spindle motor 70 is braked to forcibly and fully stop the rotation thereof before the chucking of the flexible disk 40 is released, that is, before the eject operation by the eject mechanism is actually started.

After a lapse of a second delay time (YES at step S7), the controller 30 is set to the standby state (step S8). The second delay time is set to a value necessary for the rotation of the spindle motor 70 to be fully stopped by the application of the brake thereto, which is, for example, 500 msec.

In this standby state, due to subsequent depression of the eject button 54, the eject button 54 abuts the eject plate 55 and moves the eject plate 55 in the moving direction thereof. In accordance with this movement of the elect plate 55, the pins 63 are guided along the guide grooves 55c so that the eject operation is actually started in the manner known in the art.

When guided along guide grooves 55c, the pins 63 are lifted to make the disk holder unit be raised. During this operation, the plate portion of the disk holder unit moves the magnetic head to space from the recording disk in the manner known in the art.

When the disk holder unit is raised, the lock of the flexible disk 40 is released. When released, the flexible disk 40 is partly forced out from the disk holder unit by the eject lever 51 due to a biasing force of the spring mechanism 57. So that, the flexible disk 40 can be taken out from the disk holder unit.

Simultaneously, the lock lever 52 rotates in a counterclockwise direction due to a biasing force of the spring mechanism 57 so as to lock the carriage 15. Specifically, a tip 52a of the lock lever 52 moves the carriage 15 to the inner side and engages with the voice coil 17. The movement of the carriage 15 in the inner direction is limited to a given position so as to prevent the carriage 15 from moving further in the inner direction.

As described above, according to the foregoing preferred embodiment, by utilizing the eject switch which produces the data write inhibit signal immediately after the operation of the eject button and before the actual eject operation of the eject mechanism, not only the data writing is inhibited, but also the magnetic head is moved to the landing zone of the magnetic recording medium and further the rotation of the spindle motor is forcibly stopped. Thus, not only the data written on the magnetic recording medium can be protected, but also the magnetic recording medium can be prevented from a substantial damage and further a damage of the chucking pin can also be prevented.

While this invention has far been described in conjunction with a few preferred embodiments thereof, it will now readily be possible for those skilled in the art to put this invention into practice in various other manners. For example, the position of the eject switch is not limited to that shown in FIGS. 5A and 5B or 6A and 6B. The eject switch may be disposed at any position where the eject switch is turned on immediately after the depression of the eject switch and before the actual operation of the eject mechanism. In the foregoing eject mechanism, the compression spring is used as an elastic member for maintaining the spaced-apart state between the eject button and the eject plate. However, a substitute for the compression spring may be selected from various other elastic members. For example, a plate spring, a torsion spring, a sponge, a rubber member, a tension spring or a resin spring may be used. If the resin spring is used, the resin spring and the eject button may be formed integral with each other.

U.S. patent application Ser. No. 790,950 filed Jan. 29, 1997, the disclosure of which is herein incorporated by reference, discloses a magnetic disk drive with an ejection switch for generating a data write inhibit signal which can be used as the data write inhibit signal of this specification.

What is claimed is:

1. A disk protection method for protecting a magnetic recording disk upon ejection thereof from a removable magnetic recording/reproducing device by an eject mechanism through operation of an eject button, said method comprising:

generating a data write inhibit signal immediately after a start of the operation of said eject button and before said eject mechanism actually starts said ejection of the magnetic recording disk from said removable magnetic recording/reproducing device;

inhibiting data writing relative to said magnetic recording disk in response to said data write inhibit signal; and making said eject mechanism actually eject said magnetic recording disk from said removable magnetic recording/reproducing device in a condition where said data writing is inhibited;

wherein said magnetic recording disk comprises a magnetic recording medium with a landing zone, and said removable magnetic recording/reproducing device comprises a spindle motor for rotating said magnetic recording medium and a magnetic head for carrying out data writing/reading relative to said magnetic recording medium; and wherein said disk protection method further comprises:

deenergizing said spindle motor in response to said data write inhibit signal;

moving said magnetic head in response to said data write inhibit signal so as to escape to said landing zone of the magnetic recording medium;

braking said spindle motor after a start of movement of said magnetic head and before a start of actual ejection of said magnetic recording disk; and determining a first delay time necessary for said magnetic head to securely escape to said landing zone of the magnetic recording medium, said braking of said spindle motor being started after a lapse of said first delay time from the start of movement of said magnetic head.

2. A disk protection method as claimed in claim 1, further comprising determining a second delay time necessary for rotation of said spindle motor to be fully stopped by braking said spindle motor, said actual ejection of said magnetic recording disk being started after a lapse of said second delay time from the start of braking of said spindle motor.

3. A disk protection method as claimed in claim 1, wherein said removable magnetic recording/reproducing device further comprises:

a carriage holding said magnetic head;

a drive mechanism connected to said carriage for driving said carriage to carry said magnetic head; and an eject switch connected to said eject button for generating said data write inhibit signal in response to the operation of said eject button.

* * * * *